J. C. DUNTON.
CONCRETE MOLDING MACHINE.
APPLICATION FILED SEPT. 5, 1908.

949,886.

Patented Feb. 22, 1910.
4 SHEETS—SHEET 1.

Witnesses
R. Allgier
Vrl Cilley

John C. Dunton, Inventor
By Jehiel J. Cilley, Attorney

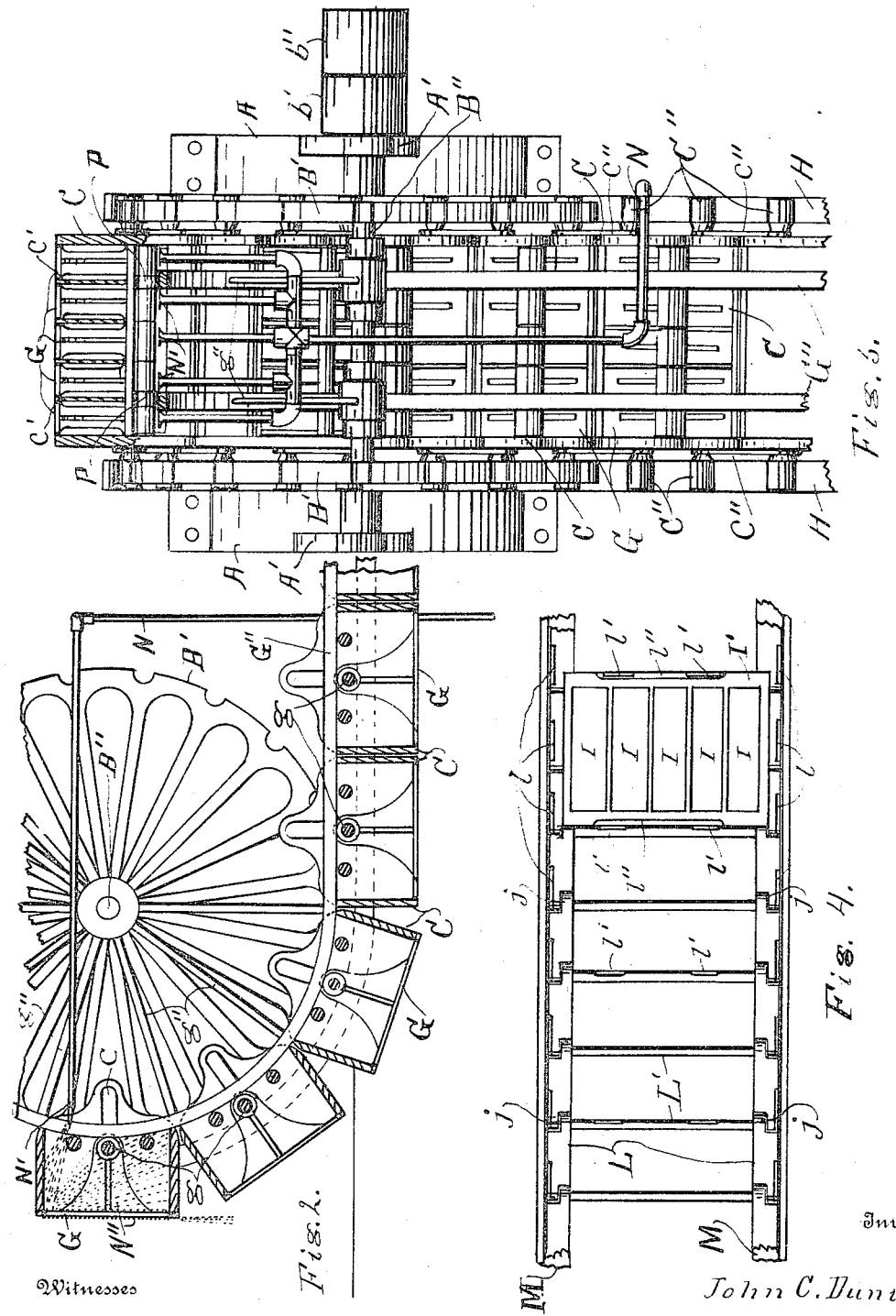

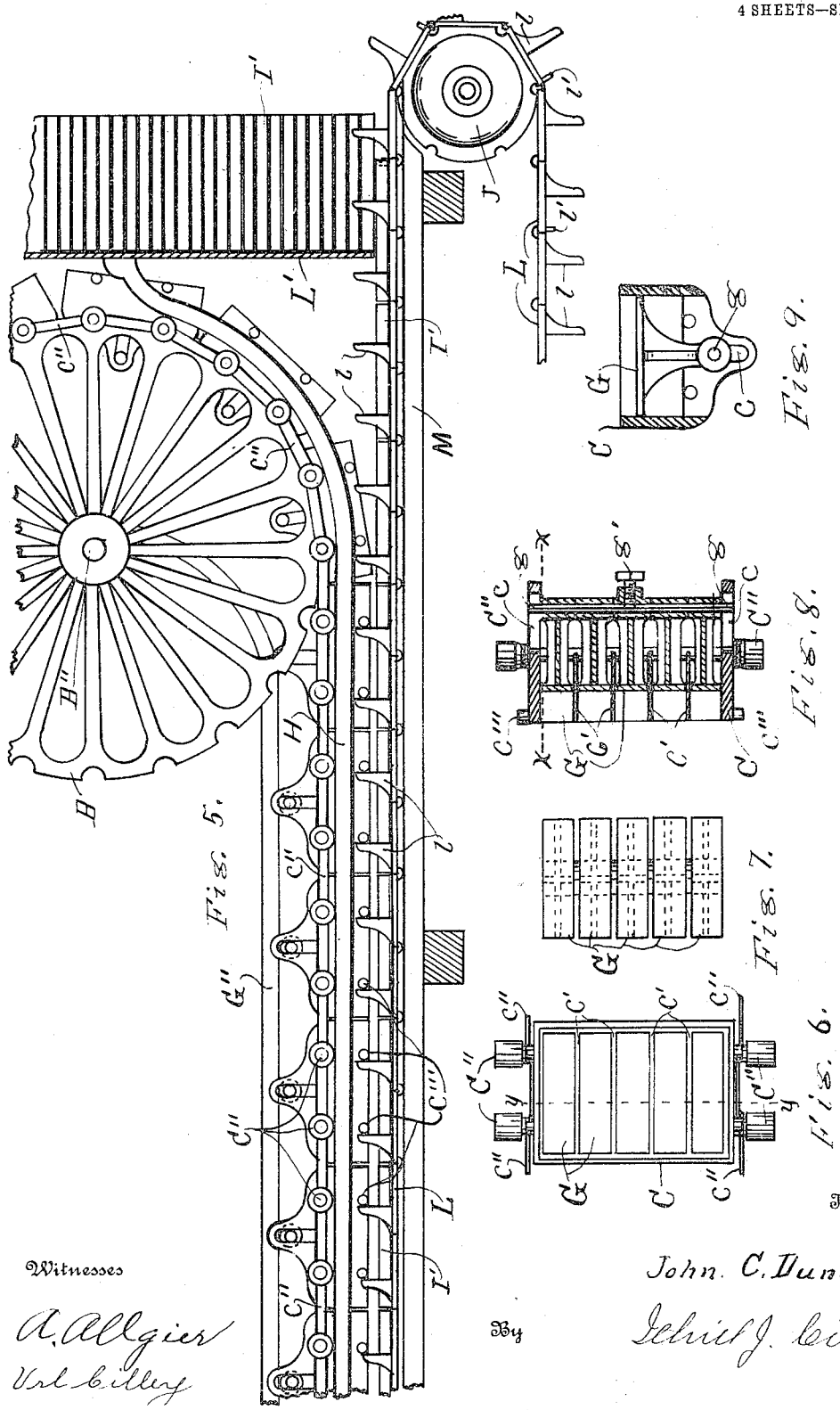

UNITED STATES PATENT OFFICE.

JOHN C. DUNTON, OF GRAND RAPIDS, MICHIGAN.

CONCRETE-MOLDING MACHINE.

949,886.

Specification of Letters Patent.  Patented Feb. 22, 1910.

Application filed September 5, 1908. Serial No. 451,911.

*To all whom it may concern:*

Be it known that I, JOHN C. DUNTON, a citizen of the United States, residing at Grand Rapids, in the county of Kent and State of Michigan, have invented certain new and useful Improvements in Concrete-Molding Machines, of which the following is a specification.

My invention relates to improvements in machines for manufacturing concrete brick, and its objects are: First, to provide a convenient and expeditious means for tamping the concrete into the molds. Second, to provide a means whereby any ornamental face may be readily placed upon brick and with practically no greater expense than for manufacturing plain brick. Third, to provide a means whereby a fancy stone face may be placed upon the brick, in natural colors and at practically no greater expense than for constructing plain brick. Fourth, to provide a means whereby pillars, cornice blocks, corner stones and concrete walls may be manufactured and thoroughly tamped without the use of a tamping bar, and, fifth, to provide a means whereby columns &c., may be made to represent varicolored laminated stone work.

I attain these objects by the mechanism illustrated in the accompanying drawing in which—

Figure 1:
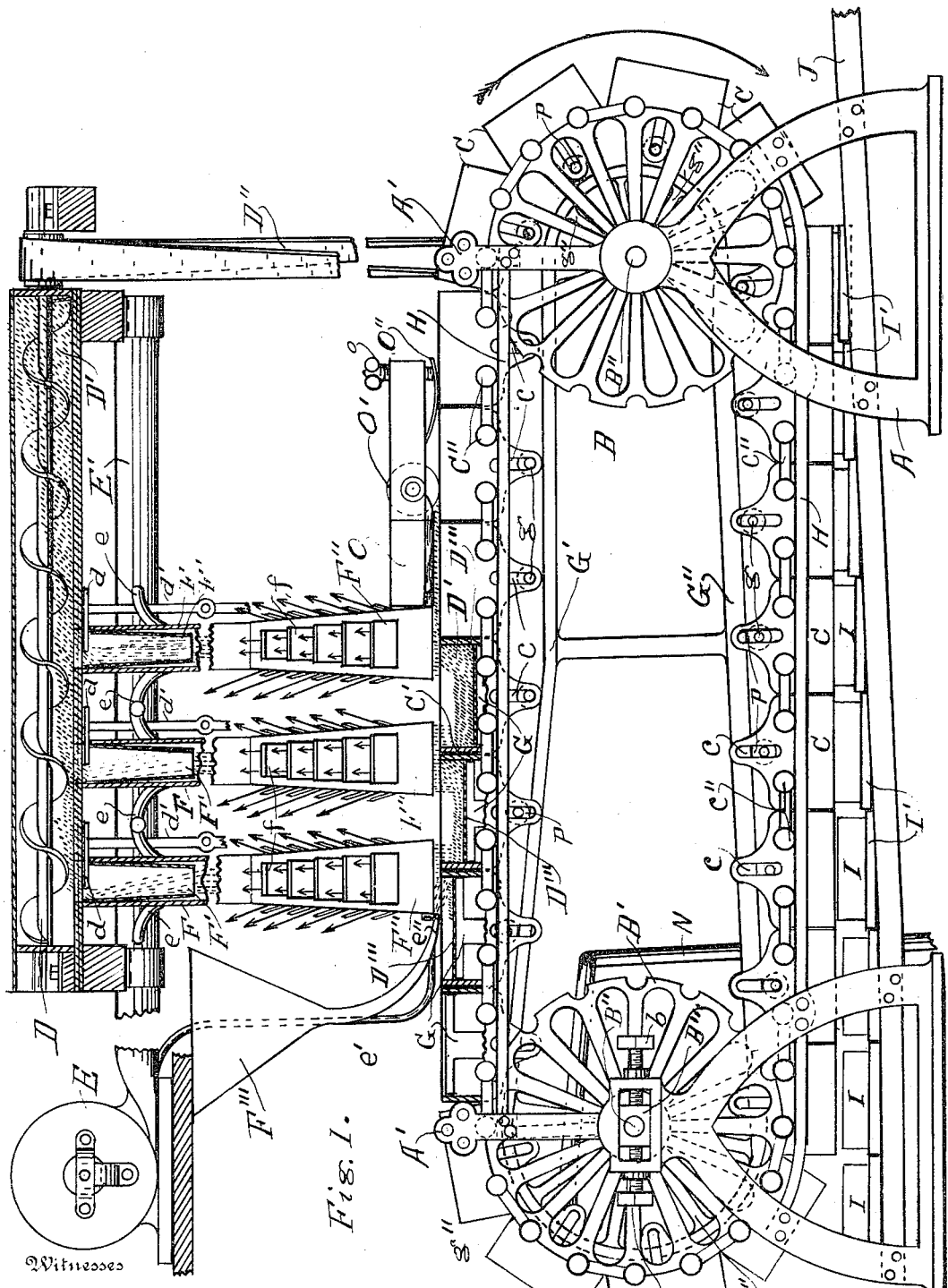
Figure 10:
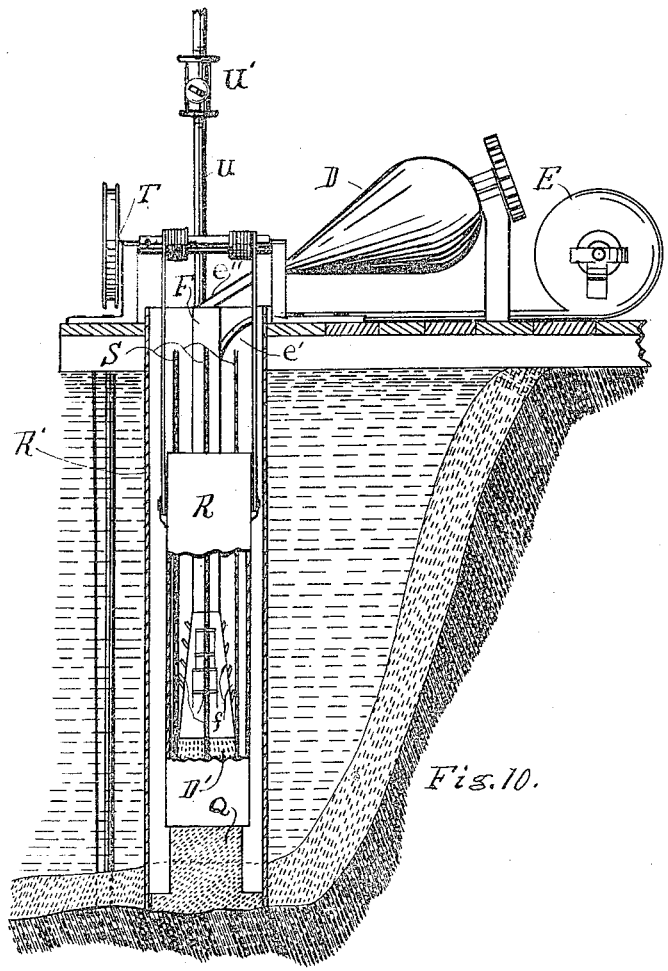

Figure 1 is a side elevation of the machine with which these objects may be attained. Fig. 2 is a sectional elevation of a portion of the same showing the manner of spraying the molds in which ordinary brick are to be made. Fig. 3 is a top plan of the same with the upper molds removed to expose the inner works and spraying mechanism. Fig. 4 is a plan of the conveyer belt and its supporting tracks. Fig. 5 is a side elevation of a portion of the machine showing one of the many processes by which the conveyer chain may be actuated. Fig. 6 is a plan of the mold with the adjustable bottom plates in place. Fig. 7 is a plan of the bottom plates removed from the mold. Fig. 8 is a section of the mold on the line $y\ y$ of Fig. 6. Fig. 9 is a section of the same on the line $x\ x$ of Fig.
8. Fig. 10 is a sectional elevation showing how this process may be applied for constructing concrete spiles for dock or breakwater construction.

Similar letters refer to similar parts throughout the several views.

The germ of my invention lies in the process of tamping or packing the plastic concrete into the mold in which the brick, column, or other object is formed, by which I am enabled to place any form of ornamental face upon the brick, to face the brick with natural stone color and grain, to build up columns in different strata showing a variety of intermingling colors giving the natural stone effect, and I find that the machinery herewith illustrated is well adapted to successfully bring about the desired effect either as to compactness of structure, ornamental face construction or natural stone surface effect.

In the construction of a machine to successfully carry out this process it is desirable, first, to provide an endless line of moving molds in which to form the brick, when constructing brick, and these molds must be provided with movable bottoms that may be, automatically, moved from a depth of mold sufficient to form the size of brick desired to a position flush with the outer edges of the molds, and a means must be provided for forcing the plastic concrete solidly into the molds, and also for forcing the desired face finish into the mold at the proper time and in the desired position.

In the accompanying drawing I have shown the molds C united into a continuous line of molds by means of the links $c''$, the molds being provided with small rollers or wheels $C''$ that travel upon the tracks H H in such a manner as to produce the least possible friction in the movement of the molds. These tracks are secured to the frames A A in such a position that the wheels $C''$ will properly engage the conveyer or sprocket wheels B B' which are supported upon shafts B'' that are journaled in the frames A A, and the wheels B' are, preferably, mounted in an adjustable box B''' that is so arranged that, with the proper manipulation of the set screws $b\ b$, the wheels B' may be so adjusted as to properly adjust the endless chain of molds C C. The molds C are divided by partitions $c'$ into compartments for molding several brick in each mold, and adjustable bottoms G are placed in these compartments in such a manner that they may be made to move back and forth the width of a brick, the back or inner ends being supported upon a shaft $g$ that slides freely in the slots $c$ in the sides of the mold, to guide the bottoms G in their movements in the molds. The shaft $g$ may be secured in the ends of the bottoms by any available means as, for instance, the set screw g', shown in Fig. 8.

The bottoms G are supported upon, and actuated by the tracks G' G'' as follows: These tracks, from the point G' in Fig. 1, stand in the proper position to hold the bottoms G in the molds, just the width of the object to be molded, until it reaches a point directly below the shaft B'', whence the portion G'' inclines downward until it reaches a point directly under the shaft B'' that supports the wheel B', where it has reached a position that will cause the bottoms G to force the brick I entirely out of the mold upon a properly prepared plaque, as I', which position is held by the track until the mold reaches a point exactly opposite when it inclines downward to the point G'. By this means the bottoms G are held so that they must gradually drop as the plastic concrete is being forced into the molds, as indicated in the molds C', shown in section in Fig. 1. In Fig. 1 I have shown the incline of the portion G'' of the track, somewhat exaggerated to more fully illustrate the action of the molds, but have shown said incline about as it should normally be in Fig. 5. It will be readily seen that with this arrangement of parts the bottoms G will begin to press downward upon the molded brick as soon as they have reached the lower portion of the vertical center line of the wheel B and will gradually continue to press them out until they are wholly clear of the molds by the time they have reached the lower portion of the vertical center line of the wheel B' where they are wholly supported upon the plaques I'. The plaques I' must be so manipulated that they will move exactly in time with the molds, and for this purpose I find the arrangement shown in Fig. 5 to be very efficient, though I am not, by any means, restricted to this construction as many other available lines of mechanism may be used with equally good results. In this figure I have shown the plaques stored in a properly prepared receptacle, as L', in position so that as one is carried along by the chain L another will drop down upon the chain and be carried along by the fingers l' to a point exactly under the mold from which a brick is to be deposited upon said plaque, and so on *ad infinitum*. The chain L is supported, and slides freely on the tracks M and, in this instance, is provided with upwardly extending arms l l placed in position to be engaged by short projections or pins c''' on the ends of the molds, so placed that the chain and plaques must move in exact unison with the molds until the bricks are entirely removed from the molds and the plaques are removed from the chain. The chains L may be supported and conveyed by any suitable form of sprocket wheel, as shown at J in Fig. 5.

The portion A'' of the frames A is designed to receive and support any suitable form of guard above the molds, not deemed necessary to show as they are simply incidental and of no material importance in connection with the invention proper.

The tracks G' G'' are supported upon the shafts B'' by means of arms g'' as indicated in Figs. 1 and 2, and the chain L is made up of the sides L and the cross bar L' with the ends at j so arranged that they may be slid together and made to interlock after the manner of ordinary malleable iron conveyer chains, and the plaques are, or may be provided with offsets l'' for the reception of the fingers l'.

Coming now to the process by which the bricks, or other articles are manufactured, the ingredients from which they are made are placed into any available form of mixing device, as indicated by the material D' entering and being carried through the mixer D, in Fig. 1 until it drops through the open gates at d into the conveyer spouts F and down through said spouts into the molds C' as indicated in Fig. 1. It is understood that the material D' is wet to the proper temper before it is placed into the mixer so that when it enters the mold it is ready for tamping solidly into the mold, and it is further understood that the simple dropping of the material from any reasonable height would not be sufficient to properly pack it in the molds, and to facilitate this action I use a very strong blower, as E, having a commodious conveyer pipe E' from which small branches e e lead into the spouts F F between the outer walls thereof and the inner walls F'', through which the material enters the main spout F, and in such a manner that all air that enters the spout must be directed downward to give the greatest possible impetus to the material as soon as it has passed the lower end of the spout F', to force it downward into the molds with great velocity so that when the material enters the molds and is stopped by striking the bottom or preceding material it will become thoroughly and solidly packed. As it would not do to allow the heavy current of air that enters the spout to pass into the molds, I have provided for its escape in the direction of the arrows in Fig. 1 by placing openings f f in the spout a sufficient distance above the molds to avert all danger of the current of air having any detrimental effect upon the molded material.

In Fig. 1 d represents gates that may be opened or shut to regulate the flow of material through the spouts F, and d' represents levers with which to manipulate said gates and D'' represents the belt that drives the mixer.

The description thus far describes the process for making plain concrete brick. When desiring to place a natural stone face upon the brick I pulverize the desired stone to a very fine powder and thoroughly wash the powder to remove foreign dust and give to the powder the proper color. I place this powder in any suitable hopper, as F''', which should terminate in a small spout entering the spout F at or near the lower end F'', and connect the blower E with this spout by means of a very small air spout $e'$ which will force the pulverized stone through the spout $e''$ into the molds C' and form a thin coating in the bottom of the mold, as at D''', which is packed to place and made to adhere firmly to the incoming concrete as it is forced to place in the molds by the air current, as hereinbefore described. When providing for forming an ornamental face upon the brick the ornament, whatever it may be, is formed upon or cut from the face of the backs G, and the material that is to form the ornament may be placed upon said face as hereinbefore described, or in any other available manner.

It is necessary to thoroughly wash out the molds after use, each time, and for this purpose I provide a water pipe N through which water is to flow at considerable pressure, and place very fine spraying points N' upon the ends of the pipe in position so that a very fine spray of water will be forced into the molds back of the bottoms G G, and with sufficient force so that a considerable water will be forced through between the edges of the bottoms G and the walls of the mold and will wash the outer face of the bottom G, as indicated at N'' in Fig. 2.

If desired dry steam may be substituted for air pressure for forcing the plastic concrete into the molds, and in many instances it is preferable, though not so for forcing the pulverized stone, &c., from the hopper F''', as this pulverized stone should enter the mold as dry as possible so that it will be properly distributed over the face of the bottoms G, where the water with which the molds have been washed will hold it until the plastic concrete is forced in upon it, thus the washing of the molds acts a double purpose: first, to thoroughly clean the molds and render the surface slippery upon the introduction of the plastic concrete so that the finished brick will slide out readily, and, second, to cause the dry pulverized stone to adhere to the mold sufficiently to retain its position and shape until secured to place with the incoming concrete, when, in addition, it causes the pulverized stone to adhere firmly to, and become a concrete part of the incoming concrete and at the same time retain its natural stone color.

In Fig. 3 $b'$ and $b''$ represent the tight and loose pulleys with which the machine is driven and P represents small antifriction rollers or wheels on the shaft $g$, designed to travel upon the tracks G' G'', to reduce the friction of the bottoms of the molds, traveling over the tracks, to the minimum.

In Fig. 10 I have shown a vertical section of an auxiliary tube R' which is designed to be immersed in water, as indicated, and well into the sandy bottom of a body of water, when the water and sand that is contained in this tube is removed and a mold, as R, for forming a concrete spile in which D' represents the concrete being forced from the spout F into the mold R, and Q represents the base of the spile with the mold R partly raised. T represents a windlass for raising the mold R as the spile is being formed, and S represents reinforcing rods in the spile, common in the construction of concrete spiles, posts and kindred articles.

This process of tamping concrete is susceptible of successful use, not only in the construction of brick, spiles and kindred articles, but may be as successfully used in the construction or formation of concrete floors, cornice, inside finish, ceilings, walls, pillars, pilasters or any other form of work to be molded from concrete manufactured from cement, sand and the several other ingredients used in this class of construction.

In Fig. 1 O represents a plow designed to remove surplus concrete from over the molds, and O' represents a heavy roller carried by the plow for the purpose, first, of carrying the plow in the desired position, and, second, to press the upper surface of the concrete down into the molds for the purpose of forming a proper surface on the brick, and of more thoroughly compressing the back portion of the brick than would be possible with only the compression produced by the current of air in the spouts F. When I desire to have particularly fine surfaces upon the back of the brick I place an adjustable trowel, as O'' upon the plow carriage in position to be made to bear upon the surface as heavily or lightly as desired, by manipulating the set screw $o$.

It is often desirable, and very advantageous, especially in spile, wall or column construction, to drop the pulverized ingredients for the concrete into the tamping spout F, in a dry state and to intermingle the moistening element, as water, saturated steam, &c., with the dry ingredients as they fall into the spout and before they reach the base of construction, or mold, and for this purpose I sometimes attach a water pipe, as shown at U in Fig. 10, in such a position that water or steam may be made to enter the spout, practically, with the pulverized ingredients to moisten them as they are passing through the spout to the mold, and to insure the proper proportions of water to the ingredients a valve, as U' may be placed in the pipe U, that may be opened and closed as desired or needed, it being understood that if water is used it should be under sufficient pressure to produce a perfect spray as it enters the spout F.

What I claim as new, and desire to secure by Letters Patent of the United States, is:

1. In a machine for making brick, an endless chain of molds, vertically movable bottoms in said molds, tracks for supporting the molds and having portions inclined from the horizontal to move the bottoms vertically as the molds move horizontally, a hopper for containing specially prepared facing material for the brick, means for forcing said material into the molds before the brick material is forced in, a mixer and carrier located above the molds, and spouts for conveying material from the mixer to the molds, means for packing the material in the molds, an endless chain and plaques below the molds for conveying the brick from the machine, and means for forcing the completed brick from the molds to the plaques.

2. In a machine for forming articles from cement concrete, a rotary mixer, molds for forming the articles, spouts leading from the mixer to the molds, means for forcing a heavy draft of air through the spout, and vents for the escape of the air before it reaches the molds.

3. In the manufacture of brick, a machine constructed with an endless chain of molds, sprocket wheels and tracks for supporting and moving said molds, adjustable bottoms in said molds, tracks for adjusting and moving said bottoms the depth of said molds, plaques for receiving the brick from the molds, an endless chain for carrying the plaques, arms projecting up from said chain, projections on the molds to engage said arms and a receptacle for storing the plaques and discharging them upon the chain, a mixer and spouts above the molds, and a blower to produce a forced draft into the molds, said spouts provided with upwardly inclined vents for the escape of air before it reaches the material in the molds.

4. In combination with a concrete mixer, a mold, a spout leading from the mixer to the mold and having backwardly inclined vents near the mold, and means for forcing a heavy draft into the spout near the mixer to carry the concrete forcibly into the mold, the draft escaping through the vents before reaching the mold.

5. In combination with a concrete mixer, an endless chain of molds, wheels and tracks for carrying said molds, vertically adjustable bottoms in said molds, tracks and guides for actuating said bottoms to receive and discharge the concrete, sprays for washing the moving molds, spouts leading from the mixer to the mold and having backwardly inclined vents, and means for forcing a heavy draft into the spouts near the mixer to force the concrete into the molds, the draft escaping through the vents before reaching the molds.

6. In combination with a concrete mixer, an endless chain of moving molds, vertically adjustable bottoms in the molds, spouts leading from the mixer to the molds and having backwardly inclined vents near the molds, a blower for forcing a heavy draft of air into the spouts near the mixer to force the concrete into the molds, the draft escaping out of the vents before reaching the molds, a hopper for containing washed stone dust, and a blower for forcing said stone dust into the molds before the concrete is forced in, to form ornamental faces upon the molded concrete as it enters the several molds.

Signed at Grand Rapids, Michigan, August 31, 1908.

JOHN C. DUNTON.

In presence of—
 ITHIEL J. CILLEY,
 L. C. WARE.